United States Patent

[11] 3,587,883

| [72] | Inventor | Allan B. Neely, Jr. |
| | | P.O. Box X, Limon, Colo. 80828 |
| [21] | Appl. No. | 793,834 |
| [22] | Filed | Jan. 24, 1969 |
| [45] | Patented | June 28, 1971 |

[54] BALE STACK LOADER FOR TRUCKS
6 Claims, 9 Drawing Figs.

[52] U.S. Cl. ........................................ 214/77,
214/130, 214/514
[51] Int. Cl. ........................................ B60p 1/48
[50] Field of Search .......................... 214/77 (P),
77, 78, 79, 80, 518, 514, 75 (T)

[56] References Cited
UNITED STATES PATENTS

| 1,113,191 | 10/1914 | Breese, Jr. .................... | 214/77(P) |
| 2,536,954 | 1/1951 | Olsen .......................... | 214/77(P) |
| 2,601,170 | 6/1952 | Retzlaff ....................... | 214/77(P) |
| 2,603,454 | 7/1952 | Newton et al .................. | 214/77(P)X |
| 2,725,152 | 11/1955 | Gwinn, Jr. .................... | 214/77(P) |
| 2,732,960 | 1/1956 | Nilson ......................... | 214/77(P) |
| 2,848,127 | 8/1958 | Grey ........................... | 214/518X |
| 3,362,547 | 1/1968 | Kovarik ........................ | 214/77(P) |
| 2,979,214 | 4/1961 | Selzer ......................... | 214/77(P) |

FOREIGN PATENTS

| 101,107 | 4/1962 | Netherlands ................. | 214/77P |
| 151,939 | 11/1962 | U.S.S.R. .................... | 214/77P |

*Primary Examiner*—Gerald M. Forlenza
*Assistant Examiner*—Robert J. Spar
*Attorney*—Van Valkenburgh and Lowe

ABSTRACT: A platform elevator for a flat bed truck adapted to be raised to the level of the truck bed and lowered to the ground. The elevator is especially adapted for handling stacks of hay bales and the like and is combined with pushers carried underneath the truck adapted to facilitate pushing a bale stack off the platform after it is lowered onto the ground. To facilitate this pushing-off operation, the platform is adapted to be moved forwardly underneath the truck bed against the pushers while the pushers are adapted to move rearwardly across the platform.

INVENTOR.
Allan B. Neely, Jr.
BY
Van Valkenburgh & Lowe
ATTORNEYS

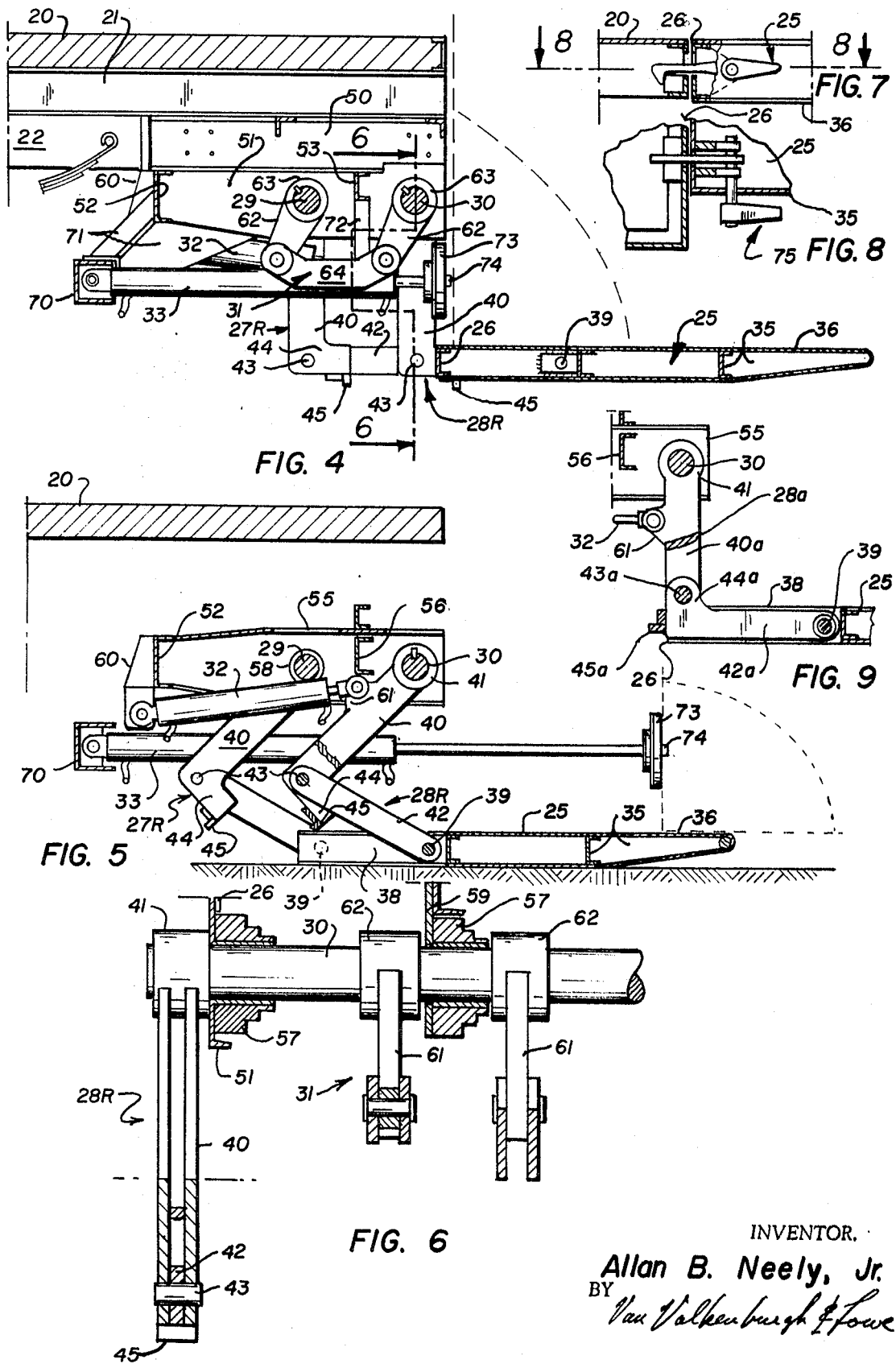

BALE STACK LOADER FOR TRUCKS

The present invention relates to platform elevators and more particularly to platform elevators which are mounted at the rear end of a truck to facilitate loading and unloading of the truck.

A primary object of the invention is to provide a novel and improved construction of a platform elevator for a truck which is useful for handling large, bulky items and especially a stack of bales, such as hay bales. Accordingly, the invention will be called a bale stack loader for trucks or simply, a bale stack loader.

Another object of the invention is to provide a novel and improved bale stack loader for trucks which is adapted to facilitate the loading and unloading of stacks of bales, such as hay bales, onto and off from a truck without the necessity of tearing a bale stack apart and handling individual bales and further, for pushing a stack of bales off the platform of the loader after it has been lowered to the ground.

Another object of the invention is to provide a novel and improved bale stack loader whose platform is adapted to be partially retracted underneath the truck bed after it is lowered to the ground to thereby facilitate the pushing of a stack of bales off the platform.

Another object of the invention is to provide, in an improved bale stack loader for a truck, a compact arrangement of mechanisms for raising, lowering and retracting the loader platform combined with mechanisms for pushing a stack of bales off the platform after it is lowered onto the ground and partially retracted underneath the truck.

Another object of the invention is to provide a novel and improved bale stack loader for a truck which is adapted to lower a stack of bales from the truck and to thereafter push the bales off the loader platform, and includes a compact arrangement of components adapted to be operatively mounted underneath the rear portion of a conventional truck bed without interfering with the rear wheels, axles and springs of the truck.

Other objects of the invention are to provide a novel and improved bale stack loader for a truck which is a neat appearing, economical, easily operated, reliable, rugged and durable unit.

With the foregoing and other objects in view, my present invention comprises certain constructions, combinations and arrangements of parts and elements as hereinafter described, defined in the appended claims, and illustrated in preferred embodiment by the accompanying drawing in which:

FIG. 1 is a side elevation view of the rear end of a flat bed truck of a type generally used for hauling bale stacks and the like, with an improved bale loader constructed according to the invention being mounted thereon and at the raised position at the deck level of the truck bed, the FIG. showing further, in broken lines, fragmentary portions of bale stacks upon the truck bed deck and on the loader platform.

FIG. 4 is a sectional elevation view as taken from the indicated line 4-4 at FIG. 2, but on an enlarged scale and with the loading platform being lowered to the ground level and to a position where the support arms therefor are vertical.

Figure 2:
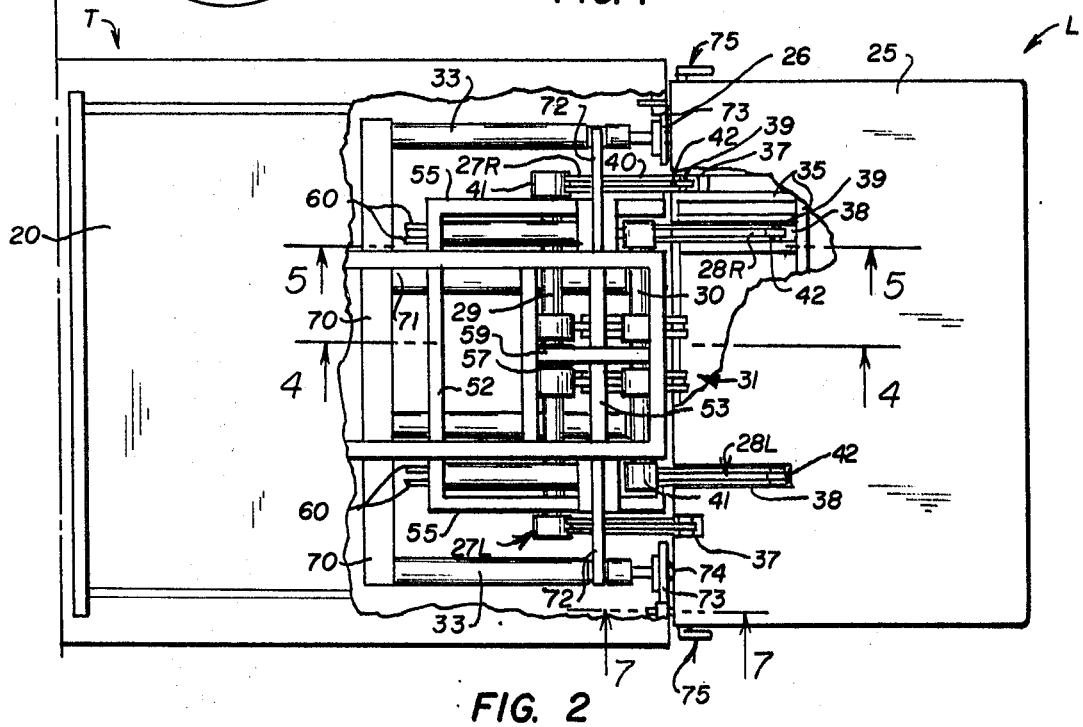
FIG. 2 is a plan view of the organization shown at FIG. 1, but with portions of the truck bed and portions of the loading platform being removed to show parts otherwise hidden from view.

FIG. 5 is a sectional elevation view as taken from the indicated line 5-5 at FIG. 2, but on an enlarged scale and with the loading platform being at the ground level and moved to its retracted position partially underneath the truck bed, to a position where the support arms are inclined underneath the truck bed and partially folded, and with pusher cylinders of the combination moving a bale stack, shown in broken lines, off the platform.

FIG. 6 is a fragmentary sectional view as taken substantially from the indicated line 6-6 at FIG. 4, but on a further enlarged scale.

FIG. 7 is a fragmentary detail illustrating an arrangement of a platform lock to hold the platform at the truck bed level, the view being partly in section, as taken substantially from the indicated line 7-7 at FIG. 2, but on an enlarged scale.

FIG. 8 is a fragmentary sectional view as taken from the indicated line 8-8 at FIG. 7.

FIG. 9 is a fragmentary sectional elevation view similar to a portion of the showing at FIG. 5, but with the support arm shown therein being vertical, as at FIG. 4, this view illustrating an alternate embodiment of the arm structure.

The use of elevator platforms at the rear end of trucks has become widespread since the labor saving utility of such devices has been fully appreciated by the trucking industry. The ordinary arrangement of the platform elevator provides for mechanisms which permit the platform to move vertically from the ground to the deck level of a truck and to thence swing upwardly to form a closure, that is, the tailgate of the truck. The conventional, so-called tailgate lift finds many uses, but it is not entirely suitable for handling large, bulky items such as a stack of hay bales. One difficult problem resides in moving such a stack off the platform after it is lowered to the ground.

A stack of hay bales, or the like, will consist of a number of individual bales which are arranged in an interlocking pattern and into a single stack which may be in the order of six to eight feet in width, length and height. Such a bale stack will weigh several thousand pounds. Therefore, if the stack is to be handled as a unit, it must be handled with machine lifts and drags. Otherwise, in the operation of loading and unloading a bale stack to and from a truck, the bales must be handled individually and the bale stack disassembled and reassembled at the expense of a substantial amount of labor. In considering ordinary operations involving the handling and trucking of hay bales, it was found that bales or bale stacks could be conveniently placed or assembled upon the deck of a truck with conventional equipment and that a bale stack could be easily moved rearwardly across the deck and onto the tailgate elevator by a conventional drag bar mechanism provided for the purpose. The primary difficulty which was encountered involved removing a bale stack from the tailgate elevator after it was lowered to the ground at a location where a fork lift truck or the like was not available.

The present invention was conceived and developed with the above and other considerations in view. It comprises, in essence, a platform elevator mounted at the rear end of a flat bed truck, adapted to receive and to raise or lower a bale stack from the ground to the deck of the truck bed. Further, the platform carrying mechanism is adapted to shift the platform partially underneath the deck of the truck when it lowers to the ground, and is combined with pushers underneath the rear end of the bed of the truck which function to commence pushing a bale stack off the platform as the platform is shifted underneath the deck and thereafter to be extended to complete the pushing of a bale stack off the platform.

Referring more particularly to the drawing, the improved bale stack loader L is mounted underneath the rear portion of frame members of a flat bed truck T. The truck T is a conventional unit having a longitudinally elongated, rectangular, flat bed 20 carried upon a pair of longitudinally extended beams 21. These bed beams 21 are supported upon the main beams 22 of the truck and the main beams are, in turn, mounted upon the rear wheels 23, being connected thereto as by springs 24, all in a conventional manner. It is to be noted that the rearward portion of the bed beams 21 overhang the main beams 22 and that this rearward, overhanging portion of the bed beams 21, is used to carry a framework F of the improved bale stack loader L, as will be described.

The bale stack loader L includes a rectangular platform 25 located at the rear end of the truck bed 20. In its raised position, the forward edge 26 of the platform abuts against the rear edge of the truck bed with the deck surfaces of both being aligned to a common surface to permit a load to be easily shifted from the platform and to the truck. In its lowered position, the platform 25 will lie upon the ground and at a retracted position, the forward portion of the platform is pulled forwardly and beneath the rear portion of the deck 20, to facilitate pushing bales off the platform as will be hereinafter described.

This platform 25 is supported upon four substantially identical arms arranged as a forward pair 27L and 27R and a rearward pair 28L and 28R. The arms of each pair are spaced apart and all are adapted to operate in unison to stabilize the platform and to hold it horizontal at all elevational positions. In this arrangement, the forward pair 27L and 27R are pivotally connected to the platform adjacent to its forward edge 26 and a rearward pair 28L and 28R are pivotally connected to the platform at an intermediate position between the forward and rear edges of the platform and preferably, at the approximate ⅓ forward point as illustrated. Each of the arms is angled to extend underneath the bed of the truck and the extended ends of each pair is connected to forward and rearward transverse shafts 29 and 30, respectively. The shafts are mounted upon the framework F which is attached to the overhanging portion of the beams 21 of the truck as heretofore mentioned. The arms of each pair are connected to the opposite ends of their common shaft, 29 or 30, to be spaced apart to better stabilize the platform. The rearward shaft 30 is located near the rear edge of the truck bed to extend across the members of frame F so the arms 28L and 28R lie at opposite sides of the frame members 21. The forward shaft 29 is longer than the rear shaft 30 and thus, the arms 27L and 27R on that shaft are spaced further apart to embrace the rearward pair of arms 28L and 28R, all to provide suitable, operative clearances when the arms swing upwardly behind the truck to raise the platform.

The two shafts 29 and 30 lie in spaced parallelism and are operatively interconnected by a center linkage 31 to swing the four arms in unison. The arms are swung to and from the raised position of the platform and from and to its lowered position by a suitable actuator, preferably by hydraulic cylinders 32 mounted upon the framework F. Other hydraulic pusher cylinders 33 are also mounted upon the framework F below the shafts to extend their pistons from a retracted position underneath the truck bed and rearwardly therefrom to serve as pushers to push bales or other loads off the platform when it is lowered upon the ground, all as will be described in detail.

The platform 25 is fabricated of longitudinal and transverse structural members 35, such as channels and pipes, which are welded together and covered with a sheeting 36 whose upper surface is sufficiently rigid to support loads placed upon it. The pivotal connection to the arms is formed in slots 37 and 38 extending inwardly from the forward edge 26 of the platform. The slots 37 wherein the forward arms 27R and 27L are located are comparatively shallow while the slots 38 for the rearward arms 28R and 28L are necessarily extended into the platform as illustrated at FIG. 2. These slots are reinforced by frame members 35 which carry pivots 39 connecting with the ends of the arms as illustrated at FIG. 5. It is to be noted that the longitudinal spacing between the pivots in the forward slots and in the rearward slots is the same as the longitudinal spacing between the forward shaft 29 and rearward shaft 30, such being necessary to maintain the platform horizontal at all elevations.

Each angled arm 27R, 27L, 28R and 28L which supports the platform 25 is formed as a base section 40 having a hub 41 connecting with its shaft 29 or 30 and an extension 42 connected to the elbow end of the base section as by a pivot pin 43. The extension is normally at right angles to the base with the extended end of the extension connecting to a pivot 39 in a platform slot 37 or 38. The base section 40 is formed as a pair of spaced, bar members which form a slot between them to receive the extension 42, a single bar member. This slot permits the arms to fold together as will be described. A short, offset elbow 44 is provided at the outer end of the base section 40 which carries a stop lug 45 to prevent an outward swinging of the extension 42 beyond 90°. Thus, the two members may fold together, but the stop lug 45 prevents the extension from swinging beyond the 90° position with respect to the arm. This lug will rest upon and may gouge into the ground surface when the platform is lowered to the ground, as hereinafter described, and should the unit be used upon ground or floor surfaces where this is undesirable, a pair of spacer boards 46 may be attached to the underside of the platform as indicated in broken lines at FIG. 4.

Figure 1:
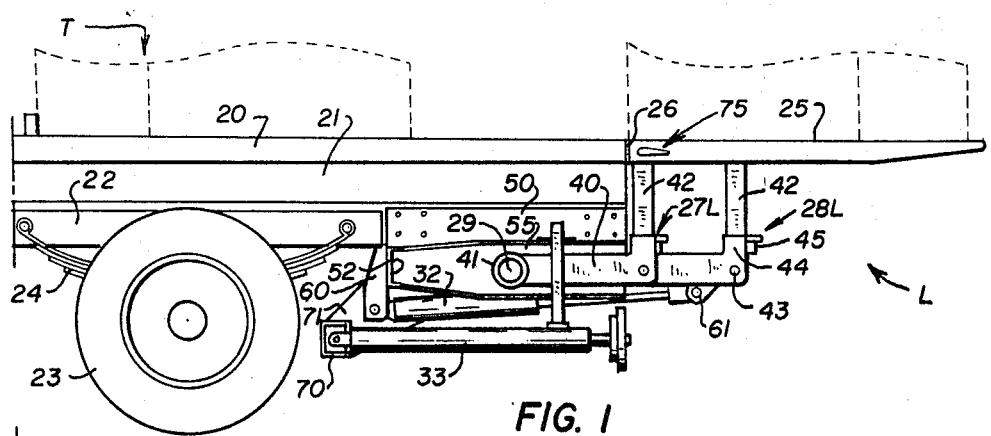

The length of the base 40 of each arm, the length of its extension 42 and the height of the shafts 29 and 30 to which the arms are connected, are all correlated in such a manner as to hold the platform at the elevation of the truck deck when the base members 40 are horizontal and the extensions 42 are vertical, as illustrated at FIG. 1; further, to lower the platform onto the ground just before the bottom position is reached, where the base members are rotated 90° downwardly the extension members are horizontal and at the level of the platform as illustrated at FIG. 4. It is to be noted that this lowering onto the ground will push the rearward end of the truck upwardly against deflection of the truck springs 24, especially if the truck is loaded. However, it was found that such pushing or lifting action was not detrimental to good performance of the unit.

These pairs of arms 27 and 28 are adapted to rotate from the downward, vertical position, where the forward edge 26 of the platform is directly below the rear edge of the truck bed, and to a further retracted position which permits the platform to rest upon the ground and at the same time, to move its forward portion underneath the rear end of the truck as to the position illustrated at FIG. 5. When this retraction movement commences, the platform is lowered onto the ground and the arm extensions 42 then rotate at the elbow pivot 43 to any suitable position to accommodate the variations of ground surface.

The framework F connected to the underside of the bed beams 21 includes a boxlike spacer 50 connected to the underside of these bed beams and a longitudinally disposed shaft-supporting plate 51 depends from each side of this box. The spacer box 50 may be eliminated where the truck is provided with main beams 22 which extend rearwardly from the rear wheel mounting and to the rear end of the truck, in which case the plate 51 will be attached to the main beams 22. The plates, in turn, are braced by transverse members, the forward edge of each plate being connected to a transverse channel 52 which projects laterally a short distance beyond each plate. A transverse spacer 53 lies between these shaft-supporting plates near the rearward end of the frame at a convenient location between the two shafts. A second pair of shaft supporting channel members 55, each having a configuration substantially the same as the lower portion of the plate 51, outstands laterally from and lies in spaced parallelism with each adjacent plate 51. The forward end of each shaft-supporting channel 55 is secured to an end of the transverse channel 52 and the rearward end of each channel is secured to its adjacent shaft-supporting plate 51 by a short spacer 56.

The length of the rearward shaft 30 is such as to extend between the supporting plates 51 and that shaft 30 is mounted in earings 57 attached to the plates 51 as best illustrated at FIG. 6. The arms 28R and 28L, attached to the ends of this shaft 30, lie in the space between the plates 51 and the channels 55.

The length of the forward shaft 29 is such as to extend through openings 58 in the plates 51, FIG. 5, and between the supporting channels 55. The shaft 29 is mounted in bearings 57 attached to the channels 55. The arms 27R and 27L are attached to the ends of this shaft 29 and thus lie outside each channel 55 as best shown at FIGS. 1, 2 and 3.

Operation of the arms to raise and lower the platform 25 is effected by a pair of hydraulic cylinders 32, heretofore mentioned. These cylinders are pivotally mounted upon pairs of lugs 60 depending from the forward face of the transverse channel 52 of the frame F. The lugs 50 and each cylinder 32 supported by them are located at a spacing which aligns it with its rearward arm 28R or 28L. Each rearward arm has a rearwardly projecting bearing ear 61, on each bar member of the arm, at a short distance below its hub 41, for pivotal connection with the head of the piston rod of the cylinder 32. The cylinder 32 is of a double acting type, adapted to forcibly extend its piston to swing its arm 28R, and 28L, to raise the platform and to forcibly retract its piston to swing its arm to lower the platform and to retract the same to a position partially underneath the rear end of the truck bed, as illustrated at FIG. 5. These cylinders pushing against arms on a common shaft 30 are operated in unison, and by controls preferably located in the cab of the truck. Such controls, and the hydraulic pumps and lines for the cylinders 32, and also for the cylinders 33, need not be described herein since they are entirely conventional.

It is essential that the shaft 29 rotate in unison with the rotation of shaft 30 to keep the platform level, and this is accomplished by the center linkage 31. This linkage consists of two sets, one at each side of bearings 57 positioned at the center of the shaft 29 and at the center of the shaft 30. These bearings are supported by a suitable, longitudinally disposed frame member 59 at the center of the structural box 50, as best illustrated at FIGS. 2 and 6. Each center link 31 consists of a pair of arms 62. A hub 63 at one end of each arm 62 is mounted and keyed onto its shaft 29 or 30 so the arms normally depend from their shafts and pivotally connect with a link 64, as best illustrated at FIG. 4. These links 64 are offset at their center portion for clearance and the arms 62 carrying them are arranged to provide the desired extent of shaft rotation to permit the platform 25 to move from its raised position level with the truck bed, FIG. 1, to a lowered and retracted position underneath the truck bed, FIG. 5.

Figure 3:
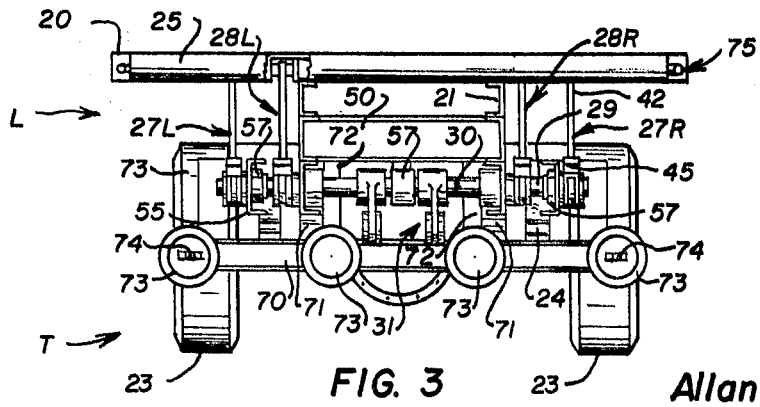
FIG. 3 is a rear elevation view of the organization shown at FIG. 1.

Four longitudinally disposed pusher cylinders 33 are mounted beneath the shaft support plate 51 and channel 55 in a transverse array across the truck at spacings which do not interfere with the arms 27R, 27L, 28R and 28L, as best illustrated at FIG. 3. The forward end of each pusher cylinder is connected to a transversely disposed beam 70 which is secured to the frame members above it by gusset plates 71, as best illustrated at FIG. 4. The rearward portion of the cylinders 33 is supported by struts 72 also connected to the frame members above the cylinders which hold the cylinders in position parallel with the truck bed.

The piston rod of each cylinder 33 carries an enlarged pusher head 73 positioned directly underneath the rearward end of the truck bed when the piston is retracted into its cylinder, as illustrated at FIG. 4. The rods of the pistons are adapted to be extended over the lowered platform to push a bale stack off the platform as in the manner illustrated at FIG. 5. The head 73 of these pushers may carry an eyelet 74 so that a chain may be fastened to the end of the cylinders, to embrace a bale stack and to facilitate pulling it upon the platform whenever such an operation becomes desirable.

It is to be noted that a platform having a length adequate to carry a bale stack will be so long that the pusher cylinder pistons cannot reach across the platform to an extent sufficient to discharge a bale stack therefrom unless they are made so long that they cannot be fitted underneath the truck bed without interfering with the truck wheels. Therefore, the retraction action of the platform underneath the end of the truck bed, heretofore described, cooperates with the pushers by moving a bale stack, first against the pusher heads 73 to push a bale stack partially off the platform. Thereafter, the pusher pistons extend to complete the movements while the platform remains retracted, as clearly illustrated at FIG. 5.

Whenever the platform is at deck level, as at FIG. 1, it may be desirable to travel with the platform so positioned. A lock 75 illustrated in detail at FIGS. 7 and 8, is provided at each side of the platform to secure the platform in this position and to ease the strain from the cylinder 32 holding the platform in position. Each lock consists of a handle 76 connected to a shaft 77 mounted on bearing members 78 in the platform. A detent 79 extends from this shaft as a hook to extend into a socket 80 in the end of the truck frame. In the unit shown, it is contemplated that this detent will be positioned by frictional action to be lowered or raised, however its operation may be regulated by springs and the like, if desired.

FIG. 9 illustrates a modified construction of an arm 28a, wherein the lugs 45a are located at the back side of the base section 40a. The arm extension 42a is provided with an offset elbow 44a and the extended end of this offset is connected to the base section by a pivot 43a. This modified arrangement thus eliminates a projection at the underside of the arms, 14 or platforms, and thus eliminates gouging of the ground surface, as by lugs 45 in the construction heretofore described.

I have now described my invention in considerable detail. However, it is obvious that others skilled in the art can build and devise alternate and equivalent constructions which are nevertheless within the spirit and scope of my invention. Hence, I desire that my protection be limited, not by the constructions illustrated and described, but only by the proper scope of the appended claims.

I claim:

1. A lifting mechanism for a platform elevator mounted upon a framework underneath the transverse rear end of the deck of a flat bed truck or the like to support a horizontally disposed platform, raise the platform to the deck level of the truck with its forward edge abutting against the rearward edge of the truck and cantilevered rearwardly therefrom and to lower the platform to the ground rearwardly of the truck, and including in combination:
  a. a pair of transversely disposed, parallel shafts lying substantially in a horizontal plane underneath the truck bed consisting of a rearward shaft near the rear end of the truck bed and a forward shaft forwardly therefrom underneath the truck bed;
  b. a pair of arms connected to each shaft at spaced positions adjacent to the ends of the shaft and extending rearwardly to the platform with the forward arms, on the forward shaft, being pivotally connected to the platform near its forward edge and with the rearward arms on the rearward shaft being pivotally connected to the platform at a spacing rearwardly of the aforesaid connection of the forward arms a distance which is the same as the spacing between the aforesaid forward and rearward shafts;
  c. wherein each arm includes a base section connecting with its shaft and an extension section connecting with the platform with the two sections being pivotally interconnected to form an elbowlike member;
  d. a stop on one of the members adapted to permit the arm sections to normally remain at an angle to each other in a general L-shape when supporting the platform, but permitting the same to fold together when the platform is on the ground; and
  e. a means adapted to rotate the arms and the shafts to raise and lower the arms in unison and thereby raise and lower the platform from a lowered position at the ground to the deck level of the truck and to also rotate the arms beyond the lowered position with the platform on the ground, forwardly, to drag the platform on the ground forwardly and underneath the rearward portion of the truck bed with the arms being folded together to permit the same to follow the ground.

2. In the organization defined in claim 1, wherein said platform is provided with a slot extending from the pivotal connection of each arm to the forward edge of the platform to provide clearance for the movement of the arm to positions above and below the platform as the arms rotate from a raised to a lowered position.

3. In the organization defined in claim 1, wherein said means for rotating said arms includes a cylinder carried upon the framework and connecting with the base section of an arm.

4. In the organization defined in claim 1, including abutments carried upon the framework below the aforesaid shafts and directly below the rear edge of the truck bed which are adapted to contact a load on the platform, such as a bale stack, whenever a loaded platform is lowered from the truck bed to the ground and the platform thereafter moves underneath the rearward portion of the truck bed.

5. In the organization defined in claim 4, including extension means carrying said abutments adapted to extend the abutments rearwardly and across the platform as when the platform is lowered upon the ground and moved part way underneath the truck bed to thereby push a load upon the platform, such as a bale stack, rearwardly and off the platform.

6. In the organization defined in claim 5, wherein said extension means comprises cylinders longitudinally disposed underneath the shafts with the pistons thereof carrying the aforesaid abutments.